March 4, 1958          A. W. McKAE          2,825,271
EXPOSURE METER DEVICE FOR PHOTOGRAPHY
Filed April 12, 1954          2 Sheets—Sheet 1
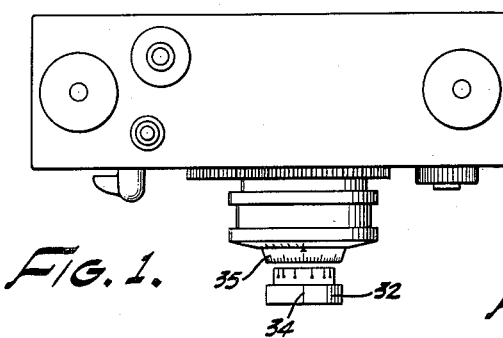
FIG. 1.
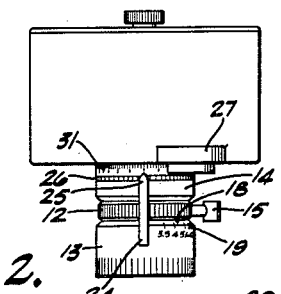
FIG. 2.
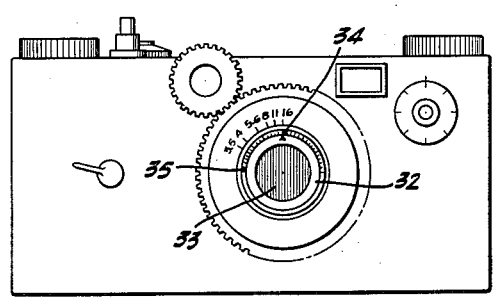
FIG. 3.
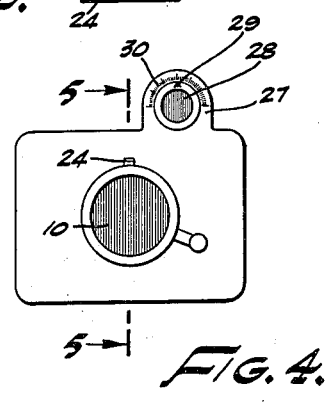
FIG. 4.
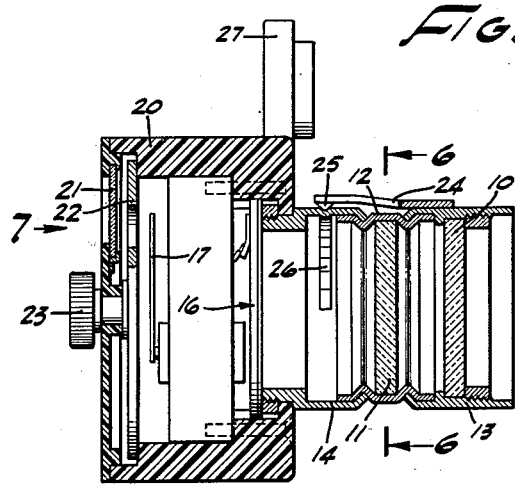
FIG. 5.
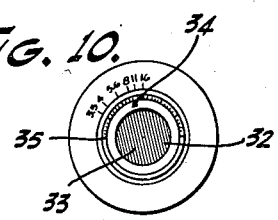
FIG. 9.
FIG. 10.
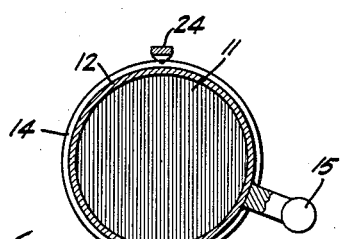
FIG. 6.
ALAN W. McKAE
INVENTOR.
BY Hazard & Miller
ATTORNEYS March 4, 1958  A. W. McKAE  2,825,271
EXPOSURE METER DEVICE FOR PHOTOGRAPHY
Filed April 12, 1954  2 Sheets-Sheet 2

ALAN W. McKAE
INVENTOR.

BY Hazard & Miller

ATTORNEYS

United States Patent Office 2,825,271
Patented Mar. 4, 1958

2,825,271

EXPOSURE METER DEVICE FOR PHOTOGRAPHY

Alan W. McKae, South Pasadena, Calif.

Application April 12, 1954, Serial No. 422,309

7 Claims. (Cl. 95—10)

This invention relates to improvements for photography.

One aspect of the invention concerns an improved light meter by which the amount of light on the subject to be photographed may be accurately determined in terms of shutter speed and iris or diaphragm opening so that a camera can be easily, quickly and accurately set to take photographs that are properly exposed.

Another aspect of the invention concerns the construction of a camera having an improved light meter incorporated therein in such a manner that the iris or diaphragm opening in the camera will be automatically adjusted to the proper size or stop opening for a selected shutter speed that may be read directly on the light meter.

Explanatory of the present invention, light meters have heretofore been developed consisting essentially of a photoelectric cell electrically connected to an electric meter, such as a galvanometer or milliammeter. A photoelectric cell is exposed or directed toward the field and a current generated thereby operates the meter which is intended to indicate the intensity of the light reflected from the field. The difficulty with the conventional light meter is that all types of light of various degrees of incidence encounter and are effective upon the photoelectric cell and, consequently, have their effect upon the meter reading. However, when the film is exposed by the camera to a certain extent a substantial fraction of the light rays are, in effect, screened out or cut out by the iris or the meter which defines the aperture opening. This lack of consistency between the meter reading on a conventional light meter and the exposure obtained on the film is well-known, and skillful photographers have been in the habit of making adjustments. Such adjustments or compensations have usually been determined from mere eyesight as to the light reflected from the field and past experience.

A primary object of the present invention is to provide an improved light meter consisting essentially of two sections of light-polarizing material, such as Polaroid arranged one behind the other, one of which is rotatable relatively to the other. Behind these sections a photosensitive cell and meter are provided. In this manner the forward section of Polaroid to a large extent eliminates extraneous light in much the same manner that the diaphragm or iris opening in the camera eliminates extraneous light. At all events the light passing therethrough is polarized light reflected from the field. By rotatably adjusting the second section of Polaroid or analyzer, this polarized light can be metered by the photosensitive cell and the meter. Consequently, the meter may be calibrated in terms of shutter speed and the position of the second section of Polaroid or analyzer relatively to the first section or Polarizer can be calibrated in terms of diaphragm or iris opening. Consequently, for a selected shutter speed the proper iris opening can be easily, quickly and accurately determined and when these factors are translated to the camera it will be found that accurate and highly consistent exposures will be obtained.

In the art of photography it is well known that certain fields reflect light which is naturally polarized. This is particularly true of light reflected at approximately 35° from nonmetallic surfaces, such as wood, glass, water or paint. The polarizing effect is less at other angles and they disappear entirely at 0° and 90°. It is also known that light from clear blue sky at right angles to the sun is strongly polarized but that at other angles polarization is not complete and vanishes at 0° and 180° from the sun. It is known that glare from certain portions of certain fields can be largely eliminated by positioning a Polaroid filter over the camera lens and rotating this filter until the objectionable glare is subdued or eliminated. This subduing of specular reflections of colored objects may result in a greater purity of color in color photography.

The present invention is such that it is capable of adapting itself to advantage with cameras equipped with such Polaroid filters in that the forwardmost section of Polaroid of the light meter may be rotated into a position wherein objectional glare will be subdued or eliminated and the Polaroid filter on the camera may be then rotated into a position wherein the lines of the Polaroid are parallel to the lines on the forwardmost section of Polaroid on the light meter. The second section of Polaroid or analyzer may then be rotated relatively thereto to measure the light from the field after its glare has been subdued or eliminated by the first section of Polaroid or Polarizer and after obtaining the proper aperture size and shutter speed from the light meter and applying these to the camera, a proper exposure may be obtained wherein the objectionable glare has been either subdued or eliminated.

A further object of the invention is to provide a camera having a light meter having the above-mentioned characteristics incorporated therein wherein the second section of Polaroid is operatively connected to the adjusting means for the camera iris. In this manner adjustment of the second section of Polaroid for the purpose of measuring light intensity brings about an automatic adjustment of the iris or diaphragm opening for a shutter speed read against the meter.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of a camera;

Fig. 2 is a top plan view of a light meter embodying the present invention which may be used in conjunction with the camera shown in Fig. 1;

Fig. 3 is a front view in elevation of the camera shown in Fig. 1;

Fig. 4 is a front view in elevation of the light meter that can be used in conjunction therewith;

Fig. 5 is a vertical section taken substantially upon the line 5—5 upon Fig. 4;

Fig. 6 is a vertical section taken substantially upon the line 6—6 upon Fig. 5;

Fig. 9 is a front view in elevation illustrating a position that may be assumed by the forwardmost section of Polaroid of the light meter for the purpose of reducing or subduing glare;

Fig. 10 is a view of the forward portion of the camera illustrating how a Polaroid filter applied thereto may be caused to assume a position parallel to the section of Polaroid shown in Fig. 9;

Figure 7:
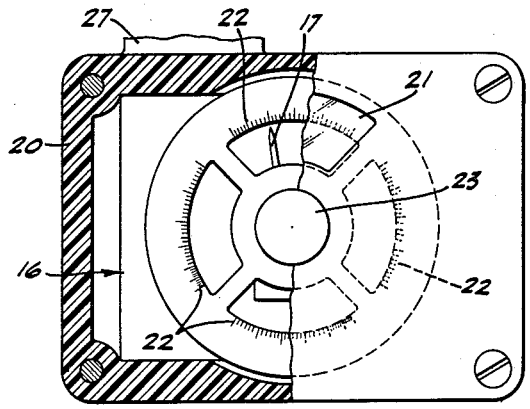
Fig. 7 is a view in elevation taken in the direction of the arrow 7 upon Fig. 5, parts being broken away and shown in vertical section.
Figure 8:
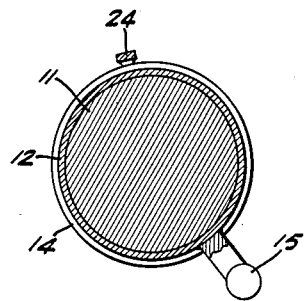
Fig. 8 is a view similar to Fig. 6, but illustrating the section of Polaroid as having been rotated into an adjusted position.

Referring to the accompanying drawing wherein similar reference characters designate similar parts throughout, and particularly to that embodiment of the invention illustrated in Figs. 1–7 inclusive the light meter in its simplest form comprises a forward section of light-polarizing material or polarizer 10 behind which there is a second or rear section of light-polarizing material or analyzer 11. The forwardmost section 10 is frequently referred to as a polarizer and the rearward section 11 is frequently referred to as an analyzer. The rear section has a bezel 12 interfitting with the bezel or frame 13 of the forward section 10, and also fitting with the tubular extension 14 on the light meter housing so that it is rotatable relative to the forward section by means of the handle 15.

Behind the rear section 11 there is a photoelectric cell, indicated at 16, on which light passing through both sections 10 and 11 may impinge. The small electric current generated by this cell operates a galvanometer or milliammeter whose needle is indicated at 17.

On the bezel 12 there is an indicator 18 which, when the second or rear section 11 is rotated, is arranged to traverse a scale 19 on the bezel 13. This scale may be graduated in terms of stop openings or aperture openings in the camera, such as F 3.5, 4, 5.6, 8, 11, and 16.

In the back of the housing 20 of the light meter there is an arcuate window 21 over the path of swing of the needle 17, and forwardly of this window there may be a scale 22 which is graduated in terms of shutter speed of the camera. As depicted on the drawing, there may be four of these scales mounted on the same rotary disk which can be rotated by handle 23 so that any one of the four scales may be positioned opposite the window 21. These scales, which may all be graduated in terms of shutter speeds, differ from one another in film speeds. Thus, one scale may have certain shutter speeds thereon corresponding to one film speed and another scale may have shutter speeds graduated thereon for another film speed. The disk is adjusted to have the proper scale 22 opposite the window 21 corresponding to the film speed that may be in the camera.

To utilize the light meter as above described in its simplified form the forward section of light-polarizing material, or Polaroid, may have its lines vertically disposed. Light passing therethrough from the field will be, consequently, polarized in a vertical direction and extraneous light will be to a large extent eliminated. If a certain shutter speed for the speed of the film that is in the camera is desired the operator merely rotates the second section 11 of light-polarizing material until the needle 17 is opposite the shutter speed selected, this being one of the graduations on the scale 22. When such an adjustment has been made it is then possible to read the index mark 18 against the scale 19 to determine the proper aperture opening that should be in the iris or diaphragm. This reading can then be immediately applied to the camera shown in Figs. 1 and 2, and the iris or diaphragm opened or closed so as to have the proper size of aperture.

The shutter timing mechanism of the camera is adjusted corresponding to the shutter speed on the scale 22 opposite which the needle 17 was pointing at the mentioned adjustment. The picture can then be taken.

As the forward section of Polaroid 10 has, in effect, screened out extraneous light which is conducive to errors in most light meters, the rotation of the second section 11 of Polaroid relatively thereto enables the amount of light entering the light meter to be accurately gauged. It will, of course, be appreciated that when the lines on the second section of Polaroid 11 are vertical or are parallel to the lines in the first section 10 that the light from the field merely passes through both sections and it is polarized vertically. When the second section or analyzer 11 is rotated it gradually dims out the light received by the photosensitive cell 16 and completely cuts out the light when the lines on the second section are arranged at right angles to the lines on the first section or, in other words, are horizontal.

It is well known in photography that if a filter of light-polarizing material, such as Polaroid, is placed over the camera lens and is rotated so that its lines are no longer vertical that glare from certain objects in the field can be greatly subdued, if not entirely eliminated.

The improved light meter is of such a character that it may be advantageously used to take advantage of this phenomena, and to this end in the preferred form of construction the forward section 10 and its bezel 13 are also rotatable relatively to the second section and relatively to the tubular extension 14 on the housing, being retained thereon by a spring finger 24, the head 25 of which is arranged to traverse a notched groove 26 on the exterior of the tubular extension.

On the housing 20 of the light meter is an upstanding ear 27 within which a section 28 of light-polarizing material is rotatably mounted. This section serves merely as an eyepiece for the user in determining the position that the section of Polaroid should assume to eliminate glare from certain objects in the field. Thus, the user in directing the light meter towards the field may merely look through the section 28 and rotate this section until the lines thereon assume such an inclined position that objectionable glare will be either subdued or eliminated.

An index point 29 on the frame for the section 28 is arranged to traverse a semi-circular scale 30 graduated in terms of degrees. After looking through the eyepiece 28 and determining the position that must be assumed by a section of Polaroid to eliminate glare, the user can then read the angle of inclination on the scale 30 opposite the index point 29. When this angle has been determined the forward section 10 is rotated to position the end of the finger 24 opposite the corresponding graduation on a scale 31, which is a counterpart of the scale 30 and which is on the tubular extension 14. In this manner the forward section 10 will be positioned so that its lines are parallel to the lines on the section 28 and are, consequently, in a position in which the objectionable glare will be reduced.

The lens of the camera is similarly equipped with a filter having a bezel 32 by which it may be applied over the lens of the camera. This bezel contains a section of light-polarizing material, indicated at 33, and has an index point 34. Around the lens of the camera there is a scale 35 which is a duplicate of the scale 31. Consequently, if the forward section 10 of Polaroid is turned from a vertical position for the purpose of reducing glare the Polaroid filter 33 is similarly rotated to assume a position parallel thereto. In this position the Polaroid filter over the lens of the camera will have the same effect of reducing glare as the section 28 had in reducing glare to the naked eye of the user.

The intensity of the light received from the field can be determined in the same manner as previously described, that is, by rotating the second section 11 by means of its handle 15 until the needle 17 is opposite the desired shutter speed indicated on the scale 22. The relative position of the index point 18 with respect to the scale 19 will indicate the proper aperture opening for the selected shutter speed to secure a proper exposure of the film.

It will, of course, be understood that it is immaterial whether the lines on the forward section 10 are vertical or are inclined in determining light intensity but that the relative positions of the lines on the two sections 10 and 11 are indicative of the light intensity and, consequently, the size of the iris or diaphragm opening that should be used for proper exposure at the selected shutter speed. For this reason, the scale 19 is on the bezel or frame for the section 10 and turns therewith when the section is rotated for the purpose of reducing glare.

When the forward section is rotated so that its lines assume an inclined position for the purpose of reducing glare, there is some slight reduction in light intensity from the average field. Consequently, when the filter 32 is turned into a parallel position it will have a similar reducing effect on the light from the field that can reach the film in the camera. This is automatically compensated for in determining the aperture size by rotating the second section 11 relative to the first section 10 while the first section is in its inclined position. In Fig. 9 I have illustrated the forward section 10 as having been turned into a slightly inclined position for the purpose of reducing glare and the manner in which the filter 32 has been turned into a parallel position in Fig. 10.

Figure 11:
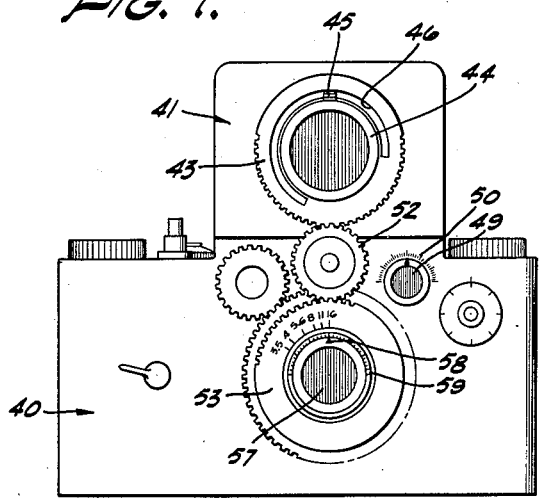
Fig. 11 is a view in front elevation of a camera illustrating a light meter embodying the present invention as having been applied thereto or built therein.
Figure 12:
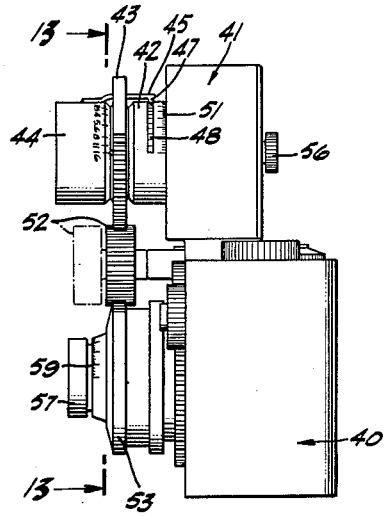
Fig. 12 is a view in end elevation of the same.
Figure 13:
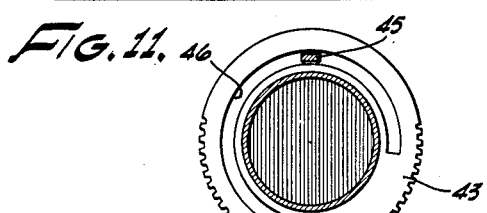
Fig. 13 is a sectional view taken substantially upon the line 13—13 upon Fig. 12.
Figure 13:
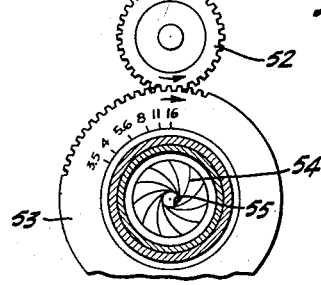

Referring to that form of construction illustrated in Figs. 11, 12 and 13, I have disclosed a camera to which a light meter embodying the present invention has been attached or has been "built in" so as to render the adjustment of the iris or diaphragm automatic. In this form of construction the camera is generally indicated at 40 and may be of any conventional or preferred type with the single limitation that forward and rearward movement of the lens relative to the focal plane for the purpose of focusing for distance must be accomplished without rotation of the lens mount or rotation of the iris or diaphragm.

In this construction the housing for the light meter is indicated at 41 having a tubular extension 42 on the forward side thereof on which there is rotatably mounted a gear segment 43 within which there is the second or rear section of light-polarizing material, such as Polaroid, corresponding to the second or rear section 11. Forwardly of this gear segment there is a bezel 44 that is rotatably mounted on the gear segment and which contains the first or forward section of light-polarizing material corresponding to the first or forward section 10. The bezel 44 has a spring finger 45 which extends rearwardly through an arcuate slot 46 formed in the gear segment and this finger has a head 47 engageable with the serrated bottom of a groove 48 on the extension 42 to hold the bezel 44 in adjusted position.

The position that the forward section of light-polarizing material within the bezel 44 is to assume for the purpose of reducing glare is determined from the position of the rotatable section 49 that may be rotatably mounted over a peep opening on the camera, and this section has an index point arranged to traverse a scale 50. The head 47 on the finger 45 may serve as an index point arranged to traverse the scale 51. By looking through the single section of light-polarizing material 49 and rotating this section it is possible to visually determine the position that this section should assume for the purpose of subduing or eliminating objectionable glare and when this has been ascertained it may be transferred to the bezel 44 and the bezel adjusted rotationally so that its lines are parallel to the lines on the section 49. Where the field is such that there is no objectionable glare the bezel 44 may be in a position wherein its lines are disposed vertically.

The gear teeth of the gear segment 43 mesh with a pinion 52 that is rotatably mounted on the camera 40 and which meshes with a gear segment on an annulus 53 which when it is rotated opens and closes the iris 54 so as to vary the size of the aperture 55.

Within the light meter housing there is disposed a photoelectric cell corresponding to the cell 16 which actuates or energizes a galvanometer or milliammeter whose pointer traverses a scale visible through a window on the back of the housing 41, as previously described. The scale may be adjusted for different film speeds by means of a handle or knob 56 corresponding to the knob 23.

In using a camera equipped with a light meter as above described the scale traversed by the needle in the light meter is adjusted to correspond to the film speed of the film within the camera and a shutter speed is selected thereon. Assuming that the field contains no objectionable glare and that the forward section of Polaroid within the bezel 44 has its lines vertically disposed the light meter is directed toward the field and the gear segment 43 rotated until the amount of light permitted to pass through both sections of Polaroid and impinge upon the photosensitive cell in the housing 41 causes the needle to move to a position opposite the selected shutter speed on the scale. Rotation of the gear segment 43 in the course of making this adjustment drives the pinion 52 and causes the annulus 53 to be rotated to open or close the iris 54 the proper amount to secure a proper exposure for the selected shutter speed. In this manner adjustment of the second section of Polaroid within the gear segment to cause the needle of the milliammeter to coincide with the selected shutter speed brings about an automatic adjustment of the iris 54. The camera is thus automatically adjusted to have the proper size of aperture opening 55 to secure a proper exposure.

If the field is such that objectionable glare is present and it is desirable to rotate the section of Polaroid within the bezel 44 to subdue or eliminate this glare the pinion 52 is pulled forwardly into the dotted line position shown in Fig. 12, being understood that this pinion is mounted on a slidable shaft which is spring-urged into the full line position shown on Fig. 12. When the pinion 52 is pulled forwardly into the dotted line position it disengages the gear teeth on the gear segment 43 and on the annulus 53. This enables the bezel 44 and the gear segment 43 to be rotated together relatively to the tubular extension 42 into a position wherein the lines on the forward section of Polaroid are parallel to the lines on the section 49 which has been visually adjusted to the position required to subdue or eliminate the objectionable glare. After this adjustment has been made the pinion 52 is returned from the dotted line position shown in Fig. 12 to the full line position, reestablishing the geared connection between the gear segment 43 and the annulus 53. Under these circumstances, the annulus 53 will be rotated directly in accordance with the rotation of the gear segment 43 and its section of Polaroid relative to the new or adopted position assumed by the forward section of Polaroid within the bezel 44.

The Polaroid filter 57 which is applied over the lens of the camera is rotated relatively thereto so that the pointer or index therein, indicated at 58, is positioned opposite the same degree graduation on the scale 59 that the pointer on the section 49 occupies against the scale 50 on the head 47 occupies against the scale 51. In this manner, although the Polaroid filter 57 will have the same glare subduing effect as the rotated Polaroid within the bezel 44, the relationship between the rotational adjustment of the Polaroid within the gear segment 43 and the aperture opening 55 will be maintained for a selected shutter speed. Whenever it is necessary to change the position of the bezel 44 and the filter 57 as indicated by the test section 49, or whenever it is desirable to return the forward section of Polaroid and the filter 57 to a position wherein their lines are vertical it is necessary to disengage the pinion 52 from the gear segment 43 and the annulus 53 while such readjustment or return is being made.

In adjusting the lens mount forwardly and rearwardly with respect to the focal plane of the camera to adjust the camera for distance the lens mount is moved forwardly and rearwardly, but without rotation, as above explained. Such movement is ordinarily relatively slight and can be accommodated by making the pinion 52 relatively thick as compared with the thickness of the gear teeth on the gear segment 43 and the annulus 53, as illustrated in Fig. 12. During such adjustment of the lens mount to focus for distance the gear teeth on the annulus 53 merely slide longitudinally between the gear teeth on the pinion.

From the above described constructions it will be appreciated that the improved light meter is highly advantageous in that by causing the light from the field to pass through the first or forwardmost section of light-polarizing material the light is polarized or rendered in a condition in which its intensity or magnitude can be accurately measured by the second section of Polaroid and the photoelectric cell. Then if a shutter speed is selected on the scale 22 traversed by the needle 17, the proper amount of iris or diaphragm opening can be instantly determined for the selected shutter speed which will produce a proper exposure.

If the field is such that there is objectionable glare the forwardmost section of Polaroid in the light meter can be rotated into a position wherein the glare is subdued or eliminated and a Polaroid filter applied over the camera lens can be rotated into the same position to eliminate the glare passing therethrough to the film. When such an adjustment has been made of the forwardmost section of Polaroid on the light meter, readings of aperture opening are still accurately obtainable in reading the index point 18 against the scale 19 on the bezel 13. In the case of the camera by disengaging the pinion 52 while the forwardmost section of Polaroid is being adjusted and reengaging the pinion after the adjustment has been made, proper orientation between the gear segment 43 and the annulus 53 is maintained.

While I have mentioned that the front polarizer is usually turned so that its lines are not in a vertical position in subduing or eliminating objectionable glare, and this is the usual situation, there are certain unusual circumstances wherein the front polarizer must assume a vertical position for this very purpose. The position that the front polarizer must assume for glare reduction purposes is in all instances determinable from the finder polarizer 28 or 49, as the case may be.

I have found that once the setting of the scale 22 is properly made for the selected film within the camera that it is then possible to photograph a wide variety of different fields with a high degree of uniformity of exposure. This is particularly true in color photography and in transparencies that are ultimately to be projected upon a viewing screen.

While I have shown four scales 22 on the disk, any of which can be used for four different film speeds, it will be understood that this number can be increased or decreased. Even a single scale may be employed which may be adjusted back and forth for different film speeds.

I have mentioned that in the camera that the adjustment of the lens mount in focusing for distance should be accomplished without rotation. This is the preferred construction, but it will be appreciated that the invention is applicable to cameras whose lens mounts are rotated in focusing for distance. However, where a Polaroid filter is used on such a lens mount the Polaroid filter must be readjusted with relation to the lens mount after each adjustment made in focusing for distance.

A particular advantage involved in the use of two relatively rotatable sections of Polaroid in a light meter is that the field of acceptance always remains constant as distinguished from light meters employing irises or adjustable diaphragms. In such light meters the field of acceptance varies with each adjustment of the iris or diaphragm and this change in the field of acceptance is conducive to obtaining erroneous reading from the conventional light meter.

Various changes may be made in the details of construction without departing from the spirit and scope of the invention as defined by the appended claims.

I claim:

1. In photography, the combination of a camera having a light-polarizing filter rotatably mounted over its aperture opening, a light meter having two light polarizers arranged one behind the other, both of which are rotatable, a photosensitive cell behind the two polarizers, a meter connected thereto so as to be operable thereby, a rotatable finder of light-polarizing material, means for indicating which position of the finder will reduce glare, means by which said position may be transferred to one of the two light polarizers on the light meter and to the polarizing filter on the camera, and means for indicating relative positions of the light polarizers on the light meter whereby the proper aperture opening on the camera for selected shutter speed may be determined therefrom and from the meter.

2. A camera having a first light polarizer, a second light polarizer arranged behind the first polarizer and rotatable relatively thereto, means operatively connecting the second polarizer to the iris of the camera so that the aperture opening in the iris will be opened and closed in accordance with the degree of rotation of the second polarizer relatively to the first, and means for measuring the light passing through both polarizers in terms of shutter speed of the camera, the first polarizer being rotatable, a light polarizer over the lens of the camera, and means whereby the light polarizer over the lens of the camera may be given the same rotational position as the first polarizer, the connection between the second polarizer and the iris being adjustable to compensate for different positions assumed by the first polarizer and the light polarizer over the camera lens.

3. In photography, the combination of two light polarizers arranged one behind the other, one of said polarizers being rotatable relatively to the other, a photosensitive cell behind the polarizers, a meter connected to the cell operable thereby, a scale traversed by the indicator of the meter, said scale being in terms of shutter speed of a camera and being adjustable to compensate for different film speeds of different films that may be used in the camera, an indicator associated with one of the polarizers, a scale associated with the other polarizer adapted to be traversed by the indicator on the mentioned polarizer when one polarizer is rotated relatively to the other, said scale on the said mentioned polarizer being in terms of aperture of the camera whereby by rotatably adjusting one polarizer relatively to the other for a given light condition the proper aperture opening for a selected shutter speed and a selected film speed, can be read directly from said scales.

4. In photography, the combination of two light polarizers arranged one behind the other, a photosensitive cell behind the polarizers, the forwardmost polarizer being rotatable relatively to the photosensitive cell, the rearmost polarizer being rotatable relative to the forwardmost polarizer and to the photosensitive cell, a meter connected to the cell operable thereby, a third light polarizer facing toward the same field toward which the mentioned polarizers are directed, a scale and indicator associated with the third polarizer to indicate its position when adjusted to eliminate glare from the field, a scale and indicator between the forwardmost polarizer and the photosensitive cell enabling the forwardmost polarizer to be similarly positioned to the position assumed by the third polarizer when glare is eliminated, a scale traversed by the indicator of the meter, an indicator and scale between the first two mentioned polarizers, the scale traversed by the indicator of the meter being in terms of shutter speed and the scale between the polarizers being in terms of aperture of a camera whereby by rotating the third light polarizer the position required to eliminate glare may be ascertained and the position of the forwardmost polarizer can be adjusted parallel thereto and by rotatably adjusting the rearmost polarizer relatively to the forwardmost polarizer for a given light condition the proper aperture opening for a selected shutter speed, can be read directly from said scales for a condition wherein a camera is equipped with a polarizing filter whose position is adjusted to a position corresponding to that of the third polarizer for the purpose of eliminating glare.

5. In photography, the combination of two light polarizers arranged one behind the other, a photosensitive cell behind the polarizers, the forwardmost polarizer being rotatable relatively to the photosensitive cell, the rearmost polarizer being rotatable relative to the forwardmost polarizer and to the photosensitive cell, a meter connected to the cell operable thereby, a third light polarizer facing toward the same field toward which the mentioned polarizers are directed, a scale and indicator associated with the third polarizer to indicate its position when adjusted to eliminate glare from the field, a scale and indicator between the forwardmost polarizer and the photosensitive cell enabling the forwardmost polarizer to be similarly positioned to the position assumed by the third polarizer when glare is eliminated, a scale traversed by the indicator of the meter, an indicator and scale between the first two mentioned polarizers, the scale traversed by the indicator of the meter being in terms of shutter speed and the scale between the polarizers being in terms of aperture of a camera whereby by rotating the third light polarizer the position required to eliminate glare may be ascertained and the position of the forwardmost polarizer can be adjusted parallel thereto and by rotatably adjusting the rearmost polarizer relatively to the forwardmost polarizer for a given light condition the proper aperture opening for a selected shutter speed can be read directly from said scales for a condition wherein a camera is equipped with a polarizing filter whose position is adjusted to a position corresponding to that of the third polarizer for the purpose of eliminating glare, the scale traversed by the indicator of the meter being adjustable to compensate for different speeds of film that may be used in the camera.

6. A camera having in combination, means for varying the aperture of the lens system of the camera, two light polarizers arranged one behind the other and facing toward the field of the camera lens system, the rearmost of said polarizers being rotatable relative to the forwardmost polarizer and operatively connected to the aperture-varying means to cause the aperture to be varied as the rearmost palarizer rotates, the forwardmost polarizer being rotatably adjustable, means for holding the forwardmost polarizer in adjusted position while the rearmost polarizer is being rotated, means for measuring the light passing through both polarizers in terms of shutter speed, and means for disconnecting and re-setting the operative connection between the rearmost polarizer and the aperture-varying means while the forwardmost polarizer is being adjusted.

7. In photography, the combination of a camera having a light polarizing filter over its lens system, a rotary light polarizer, a rotary analyzer therefor, said filter and polarizer being connected together so that in all positions of the polarizer the axes of polarization of the filter and of the polarizer will be parallel, said polarizer and analyzer being directed toward the field of the lens system of the camera, a photosensitive cell arranged to receive light passing through the polarizer and analyzer, a meter connected to the photosensitive cell, and means for varying the aperture of the lens system of the camera in accordance with the position of the analyzer relatively to the polarizer, and means for adjusting the connection between the analyzer and the aperture controlling means of the lens system of the camera for various positions assumed by the axis of polarization of the polarizer.

References Cited in the file of this patent
UNITED STATES PATENTS

| | | |
|---|---|---|
| 2,142,657 | Sauer | Jan. 3, 1939 |
| 2,145,914 | Bartels | Feb. 7, 1939 |
| 2,169,688 | Frotschner | Aug. 15, 1939 |
| 2,249,483 | Michaelson | July 15, 1941 |
| 2,250,898 | Tonnies | July 29, 1941 |
| 2,278,338 | Tonnies | Mar. 31, 1942 |
| 2,354,315 | Hermann | July 25, 1944 |